US009016701B2

(12) United States Patent
Allen

(10) Patent No.: US 9,016,701 B2
(45) Date of Patent: Apr. 28, 2015

(54) RETRACTABLE DEVICE AND UTILITY CASE

(71) Applicant: Paul Elijah Allen, Antioch, TN (US)

(72) Inventor: Paul Elijah Allen, Antioch, TN (US)

( * ) Notice: Subject to any disclaimer, the term of this patent is extended or adjusted under 35 U.S.C. 154(b) by 0 days.

(21) Appl. No.: 13/924,109

(22) Filed: Jun. 21, 2013

(65) Prior Publication Data

US 2013/0277250 A1 Oct. 24, 2013

Related U.S. Application Data

(63) Continuation of application No. 12/546,879, filed on Aug. 25, 2009, now Pat. No. 8,523,201.

(60) Provisional application No. 61/092,028, filed on Aug. 26, 2008.

(51) Int. Cl.

*B62B 3/02* (2006.01)
*G10G 7/00* (2006.01)
*A45C 5/14* (2006.01)
*A45C 7/00* (2006.01)
*A45C 13/26* (2006.01)
*A45C 13/02* (2006.01)

(52) U.S. Cl.

CPC *G10G 7/005* (2013.01); *A45C 5/14* (2013.01); *A45C 7/0045* (2013.01); *A45C 13/26* (2013.01); *A45C 2013/026* (2013.01)

(58) Field of Classification Search

USPC ........... 280/79.11, 79.3, 47.35, 47.34; 84/327
See application file for complete search history.

(56) References Cited

U.S. PATENT DOCUMENTS

| | | | | |
|---|---|---|---|---|
| 3,188,046 | A | 6/1965 | Cervenka | |
| 3,664,224 | A | 5/1972 | Campagna, Jr. | |
| 3,765,633 | A * | 10/1973 | Caudill | 248/229.12 |
| 4,084,778 | A * | 4/1978 | Dominguez | 248/314 |
| 4,147,254 | A * | 4/1979 | Bruce | 206/314 |
| 4,223,785 | A | 9/1980 | Jacques | |
| 4,345,732 | A * | 8/1982 | Gallegos | 248/201 |
| 4,378,881 | A | 4/1983 | de Vries | |
| 4,474,290 | A | 10/1984 | DeMato | |
| 4,738,180 | A | 4/1988 | McKnight | |
| 4,843,624 | A * | 6/1989 | Rashak | 381/91 |
| 4,991,809 | A * | 2/1991 | Harkey | 248/229.12 |
| 5,031,868 | A * | 7/1991 | Thomas, II | 248/283.1 |
| 5,313,866 | A * | 5/1994 | Smith | 84/327 |
| 5,513,066 | A | 4/1996 | Berman | |
| 5,528,453 | A * | 6/1996 | Berman et al. | 361/625 |
| 5,590,771 | A | 1/1997 | Cota | |
| 5,833,051 | A | 11/1998 | Tiefenbrun et al. | |
| 6,005,176 | A * | 12/1999 | Yu | 84/327 |
| 6,176,559 | B1 | 1/2001 | Tiramani et al. | |
| 6,296,213 | B1 | 10/2001 | Law, III et al. | |
| 6,439,532 | B1 * | 8/2002 | Yu | 248/443 |
| 6,462,260 | B2 | 10/2002 | Fediakov | |
| 6,484,977 | B1 * | 11/2002 | Yu | 248/125.1 |
| 6,513,768 | B1 * | 2/2003 | Hsieh | 248/121 |

(Continued)

*Primary Examiner* — Jeffrey J Restifo
(74) *Attorney, Agent, or Firm* — Shane V. Cortesi

(57) ABSTRACT

The retractable stand device may include an upper device 161, a top device 171, and a lower device 181 that may hold a musical instrument such as a guitar. In addition, the retractable stand device may be in combination with a utility case 100 or it may be a kit with installation hardware. The utility case 100 may include a hinged lid 122 for access to an upper compartment 120, a base 140 for amplifiers, fixed compartments 130, movable compartments 128, handles 118, and wheels 142. Numerous combinations of stand devices and utility case options are included.

20 Claims, 7 Drawing Sheets

(56) References Cited

U.S. PATENT DOCUMENTS

| | | | | |
|---|---|---|---|---|
| 6,772,981 | B1 * | 8/2004 | Yu | 248/122.1 |
| 6,881,884 | B2 * | 4/2005 | Hsieh | 84/327 |
| 6,951,280 | B1 | 10/2005 | Lee | |
| 6,982,373 | B1 * | 1/2006 | Yu | 84/327 |
| 7,208,666 | B2 | 4/2007 | Burch et al. | |
| 7,291,775 | B2 * | 11/2007 | Yu | 84/327 |
| 7,541,529 | B1 * | 6/2009 | Blair | 84/327 |
| 7,659,468 | B1 * | 2/2010 | Gottlieb | 84/327 |
| 7,906,717 | B2 * | 3/2011 | Wang | 84/327 |
| 8,038,109 | B2 * | 10/2011 | Ashford | 248/150 |
| 8,523,201 | B2 * | 9/2013 | Allen | 280/79.2 |
| 2004/0007117 | A1 | 1/2004 | Howard, Sr. | |
| 2007/0158509 | A1 | 7/2007 | Hubbell | |

* cited by examiner

RETRACTABLE DEVICE AND UTILITY CASE

CROSS-REFERENCE

The present application is a Continuation of the parent U.S. patent application Ser. No. 12/546,879, filed Aug. 25, 2009, titled RETRACTABLE DEVICE AND UTILITY CASE, currently pending which claims the benefit of U.S. Provisional Application Ser. No. 61/092,028, filed Aug. 26, 2008, titled Utility Case For Musical Instrument Applications. The present application is related by the same inventor for all applications, Paul Elijah Allen. The parent application U.S. patent application Ser. No. 12/546,879, filed Aug. 25, 2009 is hereby incorporated in its entirety by reference.

FIELD OF INVENTION

The present invention relates to the field of a device for holding and protecting musical instruments that may be used in combination with a utility case. The utility case with an upper compartment may have numerous unique combinations of utility case and retractable devices.

BACKGROUND OF INVENTION

There is a need for a more efficient device for holding musical instruments even though many have been attempted. There is also a need for better utility cases for transporting, musical instruments and equipment for many years as evidenced by the numerous U.S. patents issued in this area. In addition, there is a need for a combination of a device for holding musical instruments and a utility case for transporting musical equipment.

SUMMARY

A retractable device includes an upper device comprising an upper u-shaped member with an open end; a means for locking the upper device in at least one position; a means for moving the upper u-shaped member between an upper retracted position and an upper extended position; and the upper device is attachable with an approximately vertical object. The retractable device may further include a lower device including an elongated frame wherein the elongated frame further comprises a rubber coating with the elongated frame for protecting a musical instrument from damage and for securing the musical instrument on the lower device; a means for locking the elongated frame member in position; a means for moving the elongated frame between a lower retracted position and a lower extended position; and the lower device is attachable with the approximately vertical object.

A retractable stand device for holding a musical instrument comprising a top device attachable with an approximately horizontal object for holding, a neck of a musical instrument secure on a top surface for working on the musical instrument, the top device comprising a top u-shaped member hinged for extending and holding the neck of the musical instrument, and a pivot point for rotating from a horizontal retracted position to a vertical extended position wherein the pivot point further comprises a locking means such that the top u-shaped member may be held in the extended position by moving the top u-shaped member into a locked position, and a retraction means to retract the top u-shaped member when not locked in the extended position.

A retractable device includes an upper device comprising an upper u-shaped member with an open end; a means for locking the upper u-shaped member in at least one position; a means for moving the upper u-shaped member between an upper retracted position and an upper extended position; and the upper device is attachable with a an approximately vertical object. The retractable device may further include a lower device including an elongated frame member wherein the lower device further comprises a rubber coating with the elongated frame member for protecting a musical instrument from damage and for securing the musical instrument on the lower device; a means for locking the elongated frame member in position; a means for moving the elongated frame member between a lower retracted position and a lower extended position; and the lower device is attachable with the approximately vertical object in combination with a utility case, the utility case comprising: a base, and a cover wherein the cover comprises at least one cover side and a cover top, wherein the cover is attachable with the base for transporting the utility case; wherein the at least one cover side of the utility case is the approximately vertical object wherein the upper device and the lower device are attached.

A utility case including a base, an upper compartment, and a cover in which the cover comprises at least one cover side and a cover top, in which the cover is attached with the base for transporting the utility case, in which the cover further comprises a lid in an upper portion of the cover in which the lid is hinged with the cover for access to the upper compartment formed in the upper portion of the cover below the hinged lid, in which the upper compartment further includes at least two movable compartments within the upper compartment that may be adjusted in size to meet the size of the equipment and devices to be placed in the movable compartments, and foam cushion lining for protection of delicate equipment, in which the utility case further includes handles for lifting the utility case, and wheels for moving the case.

BRIEF DESCRIPTION OF THE DRAWINGS

The features, aspects, and advantages of the invention will become better understood with regard to the following description, appended claims, and accompanying drawings where:

DETAILED DESCRIPTION OF THE INVENTION

Figure 1:
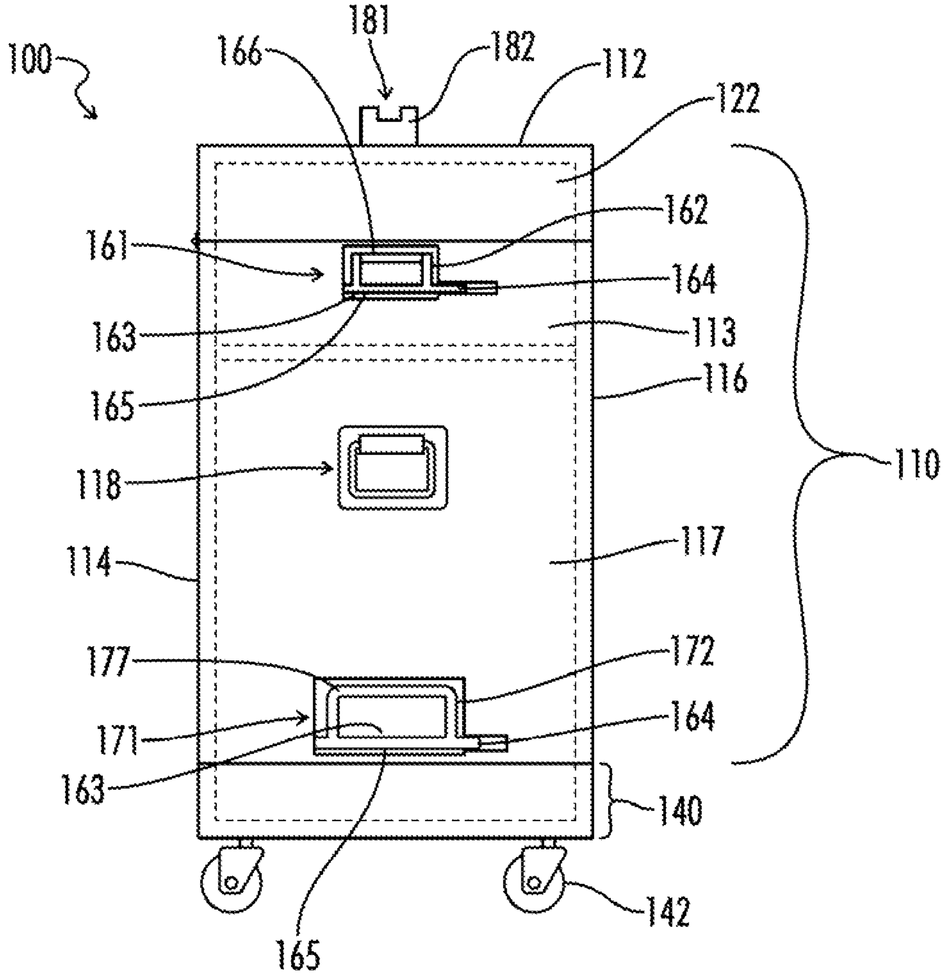
FIG. 1 is a side view of one embodiment of a utility case.

The present invention relates to the field of a device for securing and protecting musical instruments that may be used in combination with a utility case. The following description is presented to enable one of ordinary skill in the art to make and use the invention and to incorporate it in the context of particular applications. Various modifications, as well as a variety of uses in different applications will be readily apparent to those skilled in the art, and the general principles defined, herein may be applied to a wide range of embodiments. Thus, the present invention is not intended to be limited to the embodiments presented, but is to be accorded the widest scope consistent with the principles and novel features disclosed herein.

Overview:

As illustrated in FIGS. 1 through 8, a retractable stand device may comprise a combination of an upper device 161, a lower device 171, and a top device 181 that support, hold, or secure a musical instrument such as a guitar. For stability these retractable stand devices may be attached with a vertical object and or a horizontal object. The vertical or horizontal objects include many objects such as a utility case 100, a wall, and a table but are not limited to these objects. An upper u-shaped member 162, elongated frame member 172, and top u-shaped member 182 are retractable and may be locked in the extended or retracted position and the devices have a means for moving between the extended and retracted positions. The retractable stand device may be in combination with a utility case 100 or it may be a kit with installation hardware. The utility case 100 may include a cover 110, a hinged lid 122 for access to an upper compartment 120, a base 140 for amplifiers, fixed compartments 130, movable compartments 128, handles 118, and wheels 142. Numerous combinations of retractable stand device and vertical and horizontal object combinations including a utility case option are included.

Design Specifications:

The Retractable Stand Device

FIGS. 1, 2, 2A, 2B, 3, 6, 7, and 8 illustrate retractable stand devices attached with a utility case 100 on a side or top of a cover 110. One such retractable stand device is an upper device 161 in which the upper device 161 includes an upper u-shaped member 162 with an open end, a means for moving the upper u-shaped member 162 between an upper retracted position and an upper extended position, and a means for locking the upper device 161 in the extended or the retracted position, wherein the upper device 161 is attachable with an approximately vertical object. The upper u-shaped member 162 allows a neck of a musical instrument to rest in a u-shape 167 wherein the u-shape 167 helps to secure the musical instrument for protecting and restraining the musical instrument on the stand devices. The upper u-shaped member 162 may have the u-shaped opening to open toward the left, right, or center when the upper u-shaped member 162 is extended horizontally. The upper device 161 may further comprise a means for securing, the neck of the musical instrument in the open end of the upper u-shaped member 162. The means for securing the neck of the musical instrument may include a spring loaded bar 166 wherein the spring loaded bar 166 pivots 168 over the open end of the upper device u-shaped member 162 to allow the upper u-shaped member 162 to receive the neck of the musical instrument and to remove the neck of the musical instrument from the upper u-shaped member 162. The spring, loaded bar 166 may be spring loaded to return to close the open end of the upper u-shaped member 162 and thereby hold the musical instrument in position.

Figure 2:
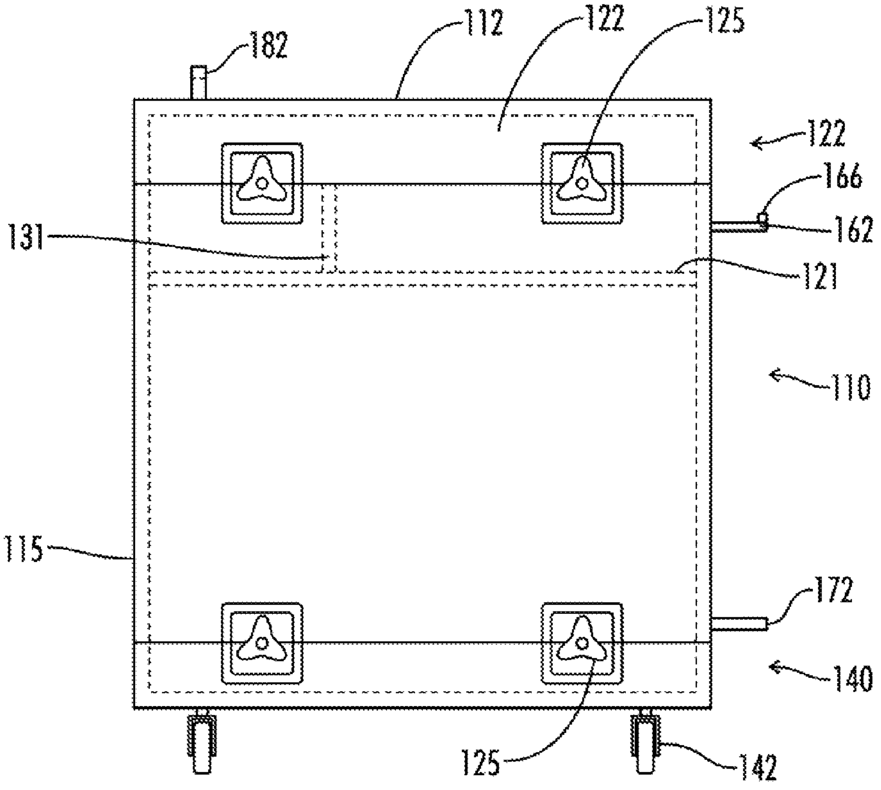
FIG. 2 is a front view of one embodiment a utility case depicting a top device in an extended vertical position.
Figure 2A:
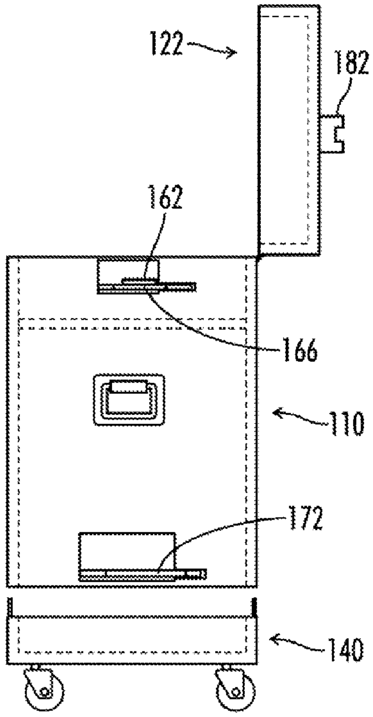
FIG. 2A is a side view of FIG. 2 with the lid opened.
Figure 2B:
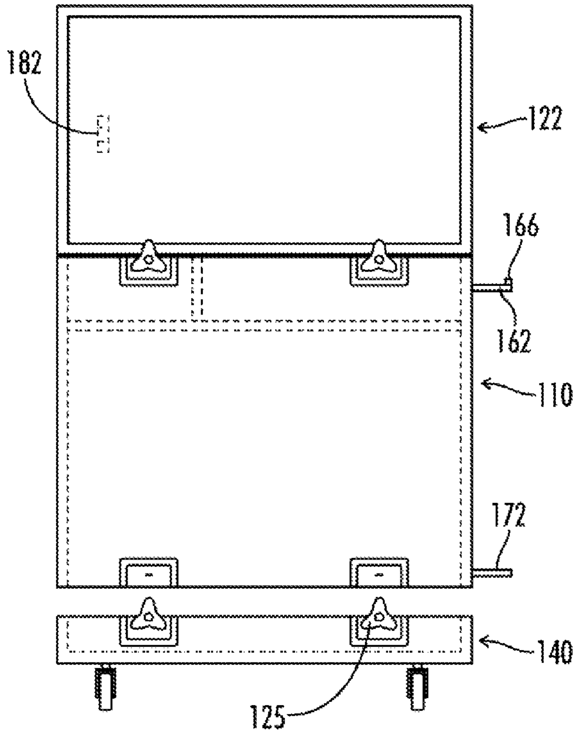
FIG. 2B is a front view of FIG. 2 with the lid opened.
Figure 3:
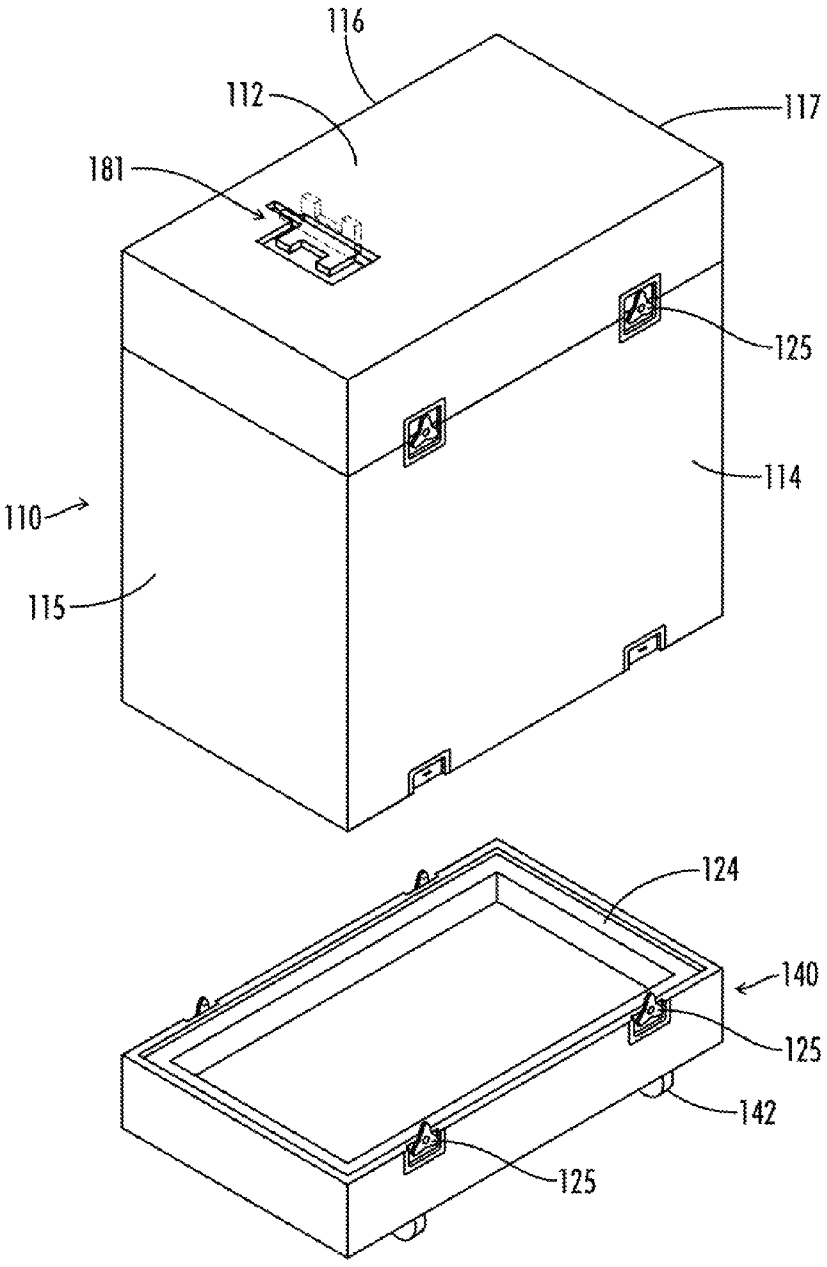
FIG. 3 is an upper front perspective view of one embodiment of a utility case with a cover removed from a base.
Figure 4:
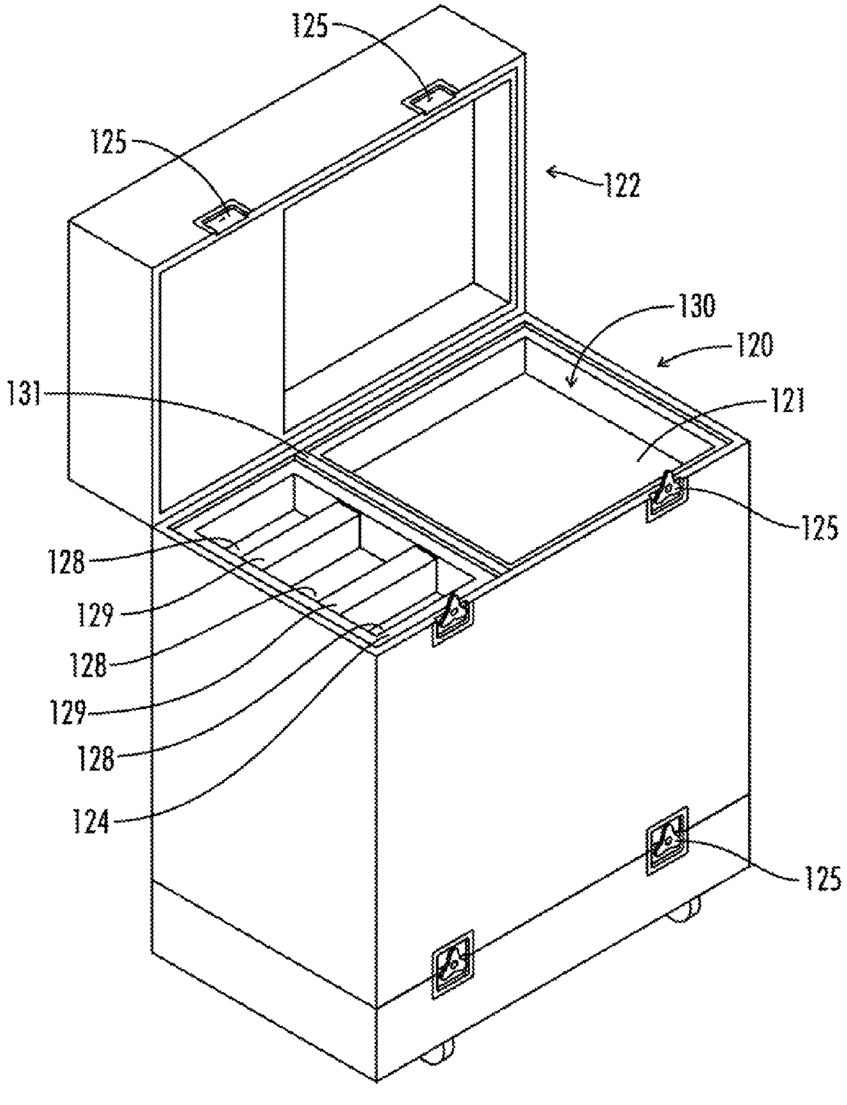
FIG. 4 is an upper front perspective view of an embodiment of a utility case with a lid raised allowing access to an upper compartment.
Figure 5:
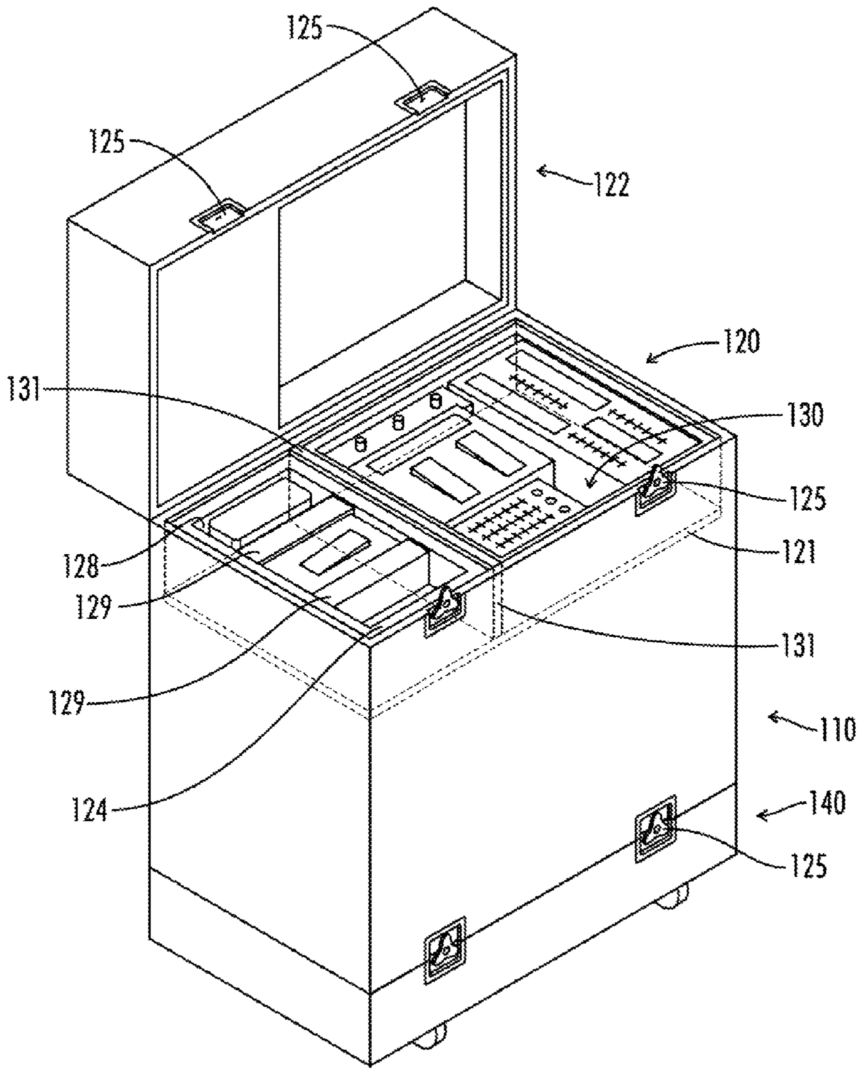
FIG. 5 is an upper front perspective view of all embodiment of a utility case with a lid raised allowing access to an upper compartment illustrating equipment stowed in the upper compartment.
Figure 6:
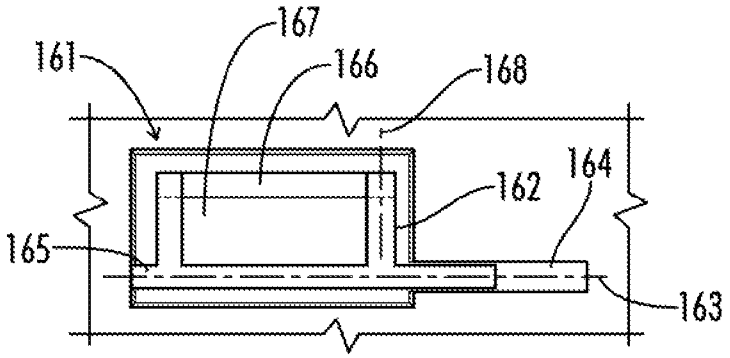
FIG. 6 is an enlarged side view of one embodiment of an upper device.
Figure 7:
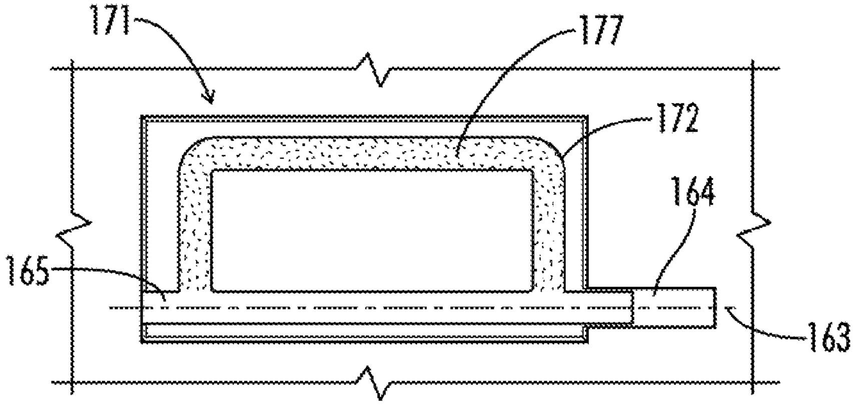
FIG. 7 is an enlarged side view of one embodiment of a lower device.
Figure 8:
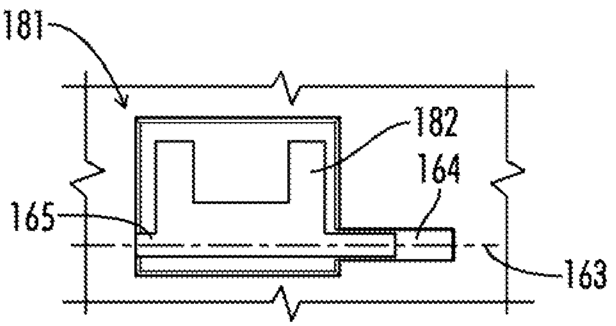
FIG. 8 is an enlarged top view of one embodiment of a top device.

The upper device 161 may be used without the assistance of a lower device 171 to hold the musical instrument in place. However, a retractable stand device that includes the upper device 161 would typically include the lower device 171. The lower device 171 comprises an elongated frame member 172, normally a length of material bent to form the elongated frame member 172; a means for locking the lower device 171 in position; a means for moving the elongated frame member 172 between a lower retracted position and a lower extended position; and the lower device 171 is attachable with an approximately vertical object. The lower device 171 elongated frame or rectangular shaped member 172 may also include a rod or tube shaped in a rectangular shape 172. The lower member 171 may further comprise a rubber coating 177 with the elongated frame member 172 for protecting the musical instrument, especially the lower bout when the musical instrument is a guitar, from damage and to help secure the musical instrument on the lower device 171. The lower device 171 is attachable with an approximately vertical object that may include a utility cover as depicted in FIGS. 1, 2, and 7. In this embodiment the lower device 171 typically is on the same side of the cover 110 as the upper device 161 and located below the upper device 161. The lower device 171 may be positioned in relation to the upper device 161 such that the base of the musical instrument rests on the lower device 171 and the upper device 161 is positioned above the lower device 171 at a height that would effectively secure the neck of the musical instrument in the upper device 161. Several upper and lower devices 161, 171 may be spaced around a utility case 100.

The retractable stand device may further include a top device 181. The top device 181 comprises a top u-shaped member 182 with an open end; a means for moving the top u-shaped member 182 between a top retracted position and a top extended position; a means for locking the top device 181 in the top extended and or top retracted position; and the top device 181 is attachable with an approximately horizontal object as shown in FIGS. 1, 2, 2A, 2B, 3, and 8. The top device 181 may be used for holding a neck of a musical instrument secure on the top of a horizontal object such as the top of a utility case 100 while working on the musical instrument. The top u-shaped member 182 may be hinged for extending and holding the neck of a musical instrument, and include a pivot point 163 for rotating between the horizontal retracted position and the vertical extended position. The top u-shaped member 182 may open upward when the top u-shaped member 182 is extended in the vertical position. The top device 181 may include a retractions means 165. The upper and top u-shaped members 162, 182 may be manufactured such that they are interchangeable. In this embodiment the upper device 161 may be attached with a horizontal object to function as a top device 181 and the top device 181 may be attached with a vertical object to function as an upper device 161. In addition, the upper and top u-shaped members 162, 182 may also include a cushion protective substance 177 wherein the musical instrument neck is protected when resting in the u-shaped member 162, 182.

Means for Moving:

The upper device 161, the lower device 171, and the top device 181 include a means for moving that may comprise a pivot point 163 for rotating or moving between the retracted position and the extended position. The means for moving the upper u-shaped member 162 between an upper retracted position and an upper extended position the means for moving the elongated frame member 172 between a lower retracted position and a lower extended position; or the means for moving the top u-shaped member 182 between a top retracted position and a top extended position may include but are not limited, to any combination of: gravity, a pivot point with a spring, or a physical movement by the user. In addition, the upper device 161 may include a retraction means 165 to retract the upper u-shaped member 162 when the upper u-shaped member 162 is not locked in the extended position. The means for moving, may comprise a retraction means 165 that may include a spring mechanism that retracts the upper u-shaped member 162 to a retracted position whenever there is not a force present to restrict movement of the upper u-shaped member 162 from the retracted position or a force to hold the upper u-shaped member 162 away from the retracted position. The lower device 171 may include an elongated frame or a rectangular shaped member 172 with a pivot point 163 for rotating from the retracted position to the extended position. The lower device 171 may also include a retraction means 165 to retract the elongated frame member 172 when a force is not applied to hold elongated frame member 172 in the extended position or a force to hold the elongated frame member 172 in the retracted position. The top device 181 may include a top u-shaped member 182 hinged for extending and holding, the neck of a musical instrument, a pivot point 163 for rotating from the horizontal retracted position to the vertical extended position and the top device 181 may further comprise a retraction means for retracting the top u-shaped member 182 when the top u-shaped member 182 is not locked in the extended position. The top u-shaped member 182 opens upward when the top u-shaped member 182 is extended in the vertical position. The top device 181 may include a retractions means 165

Means for Locking:

The upper device 161, the lower device 171, or the top device 181 include a means for locking wherein a pivot point 163 may cooperate with a looking means 164 such that the upper u-shaped member 162, the elongated frame member 172, or the top u-shaped member 182 may be held in the extended position. One locking means may include a notch 164 wherein the upper u-shaped member 162, the elongated frame member 172, or the top u-shaped member 182 with the pivot point 163 may be positioned by moving or sliding the upper u-shaped member 162, the elongated frame member 172, or the top u-shaped member 182 into a locked position by sliding the upper u-shaped member 162, the elongated frame member 172, or the top u-shaped member 182 left or right into the notch 164 while the upper u-shaped member 162, the elongated frame member 172, or the top u-shaped member 182 is in the extended position. The notch 164 restrains the upper u-shaped member 162, the elongated frame member 172, or the top u-shaped member 182 from returning to the retracted position. The upper device 161, and the lower device 171 may be attached with the approximately vertical object such that the pivot point 163 is above the upper u-shaped member 162 or the elongated frame member 172 such that gravity would retract the member when the member is not locked in the extended position. The upper, lower, and top devices 161, 171, 181 may include a stop with the means to move between the extended and the retracted position such that the movement is limited to approximately ninety degrees. The utility case 100 handle 118 may have a stop such that as the user lifts the handle 118 it stops at approximately ninety degrees thus the handle 118 is rotated to an extended position defined by the stop for lifting the utility case 118. The upper and lower devices 161, 171 may use this same principle except lowering the u-shaped member 162 or the elongated frame member 172 approximately ninety degrees to a stop for an extended position instead of raising the u-shaped member 162 or the elongated frame member 172 approximately ninety degrees to the stop as for the handle 118. In some embodiments gravity may hold the member 162, 172, or 182 in the extended position. The top device 181 may use an over-centered stop wherein the top u-shaped member 182 rotates past ninety degrees to maintain the top device 181 in an extended position. In addition, the locking means for preventing movement of the members 162, 172, and 182 may include but is not limited to a clip, snap, slide with notch, and friction between the moving parts of the device 161, 171, 181 for locking the device in the retracted position or the extended position or locking the device between these positions.

The Utility Case:

As illustrated in FIGS. 1 through 5, a combination utility case 100 includes: a cover 110 and a base 140. The cover 110 and the base 140 may be combined with an upper compartment 120 including a lid 122 for access to the upper compartment 120. The cover 110 and base 140 may be combined with a device or devices 161, 171, 181 that extend and retract in relationship with the utility case 100 that may hold a musical instrument such as a guitar stand may hold a guitar. A typical combination utility case 100 may include a utility case 100 combined with an upper device 161 and a lower device 171 on one side of the utility case cover 110 for extending and holding a guitar with the upper and lower device 161, 171. Another combination utility case 100 may include a utility case 100 combined with a top device 181 for holding a guitar in position while working on the guitar such that the instrument may rest on top 112 of the utility case 100 with the top device 181 holding the neck of the guitar in position while adjusting or repairing the guitar. Still another combination may include a utility case 100 combined with an upper compartment. 120 in the upper portion of the utility case 100 cover wherein a lid 122 is included with the top 112 of the cover 110 to allow access to the upper compartment 120. A number of different combinations of these elements along with the use of one or more sides as musical instrument stands are envisioned within the metes and bounds of this specification.

The Cover 110:

As depicted in FIGS. 1 through 5, the utility case 109 for musical instrument equipment generally includes two components, a cover 110 and a base 140. The cover 110 includes at least one side 113. Typically, the cover 110 includes a top 112 and four sides, a front side 114, a left side 115, a rear side 116, and a right side 117. The cover 110 may also include an upper compartment 120 in the upper portion of the cover 110. The upper compartment 120 may be formed by addition of an upper compartment floor 121 attached with the upper portion of the cover 110. In addition to one large upper compartment, the upper compartment 120 may be divided into several smaller compartments. These compartments may be adjustable for the size of the equipment to be stowed in the adjustable compartment 128. In the multiple adjustable compartment application, an adjustable wall 129 may be used to adjust the compartment size. The adjustable wall 129 may vary from being able to move a simple piece of foam placed in the desired location to separate the equipment and hold the equipment in place as it is transported, to a more sophisticated snap-in adjustable wall that can be snapped out and snapped into several locations. The upper compartment 120 may also have a fixed size compartment 130 within the upper compartment 120. This fixed size compartment may be desirable in applications where an adjustable size is not needed but a certain size in routinely used for the application. A fixed wall 131 may be secured with fasteners including but not limited to rivets, screws, epoxy, glue, and joints joining the fixed wall 131 and the upper compartment 120 or other fixed walls 131. The upper compartment 120 may also include a combination of both fixed 130 and adjustable compartments 128 in the same embodiment. The fixed or adjustable walls 129, 131, upper compartment 120, and cover 110 may include foam lining 124 for protection of delicate equipment. The top 112 of the cover 110 may include a hinged lid 122 and fasteners 125 for securing the hinged lid 122 in place or releasing the hinged lid 122 to allow the hinged lid 122 to be pivoted open for access to the upper compartment 120. The hinged lid 122 may have a hinge stop to allow only a limited number of degrees of rotation when opening the hinged lid 122. The cover 110 may have at least one handle 118 for moving and/or lifting the utility case 100 and or lifting the cover 110 off of the base 140. The cover 110 and the base 140 may have fasteners 125 to secure the cover 110 with the base 140. The fasteners 125 may be releasable buckle-type fasteners.

The Base 140:

As shown in FIGS. 1 through 5, the base 140 may include fasteners 125 that are releasable for attaching the base 140 with the cover 110. The base 140 may support amplifiers or other larger equipment used with musical instruments. Typically, the base 140 will be foam lined 124 to protect delicate equipment. The base 140 may also have casters or wheels 142 for ease of moving the utility case 100 from one location to another. The base 140 and the cover 110 may be made of durable plastic or aluminum or similar material for durability and light weight.

Upper Compartment with Adjustable and Fixed Foam Lined Compartments:

As depicted in FIGS. 1 through 5, one embodiment may include a utility case 100 and an upper compartment 120 combination wherein the combination comprises: a base 140, and a cover 110 wherein: the cover 110 comprises at least one cover side 113 and a cover top 112, the cover 110 is attached with the base 140 for transportation of the utility case 100, and the cover 110 further comprises a lid 122 in an upper portion of the cover 110 wherein the lid 122 is hinged with the cover 110 for access to the upper compartment 120 formed in the upper portion of the cover 110 below the hinged lid 122, wherein the upper compartment 120 further comprises at least two movable compartments 128 within the upper compartment 120 that may be adjusted in size to meet the size of the equipment and articles to be placed in the movable compartments, and foam cushion lining 124 for protection of delicate equipment, wherein the utility case 100 may further comprise handles 118 for lifting the utility case 100 or the cover 110, and wheels 142 for moving the case 100.

Kit:

As illustrated in FIGS. 1, 2, 6, and 7, one embodiment of the retractable device may comprise a kit including an upper device 161 comprising an upper u-shaped member 162, as pivot point 163 for rotating from the vertical retracted position to the horizontal extended position wherein the pivot point 163 further comprises a locking means 164 such that the upper u-shaped member 162 may be held in an extended position by moving the upper u-shaped member 162 into a locked position, a retraction means 165 to retract the upper u-shaped member 162 when not locked in the extended position; a lower device 171 comprising an elongated frame or a rectangular shaped member 172 with a pivot point 163 for rotating between the vertical retracted position and the horizontal extended position wherein the pivot point 163 further comprises a locking means 164 such that the elongated frame member 172 may be held in the extended position by moving the elongated frame member 172 with the pivot point 163 into a locked position, a retraction means 165 to retract the elongated frame member 172 when not held in the extended position, wherein the lower device elongated frame member 172 may comprise a rod or tube shaped in a rectangular fashion and a rubber coating 177 with the elongated frame member 172 to protect the musical instrument from damage and to secure the musical instrument on the lower device 171; and an assortment of hardware for attaching the upper device 161 and the lower device 171 with the utility case 100.

What is claimed is:

1. A musical instrument case comprising:

a floor:

a plurality of exterior sidewalls extending upwardly from the floor;

an interior defined by the floor and the plurality of exterior sidewalls;

a moveable lid located above the plurality of exterior sidewalls;

a case height extending from the floor to the lid;

a guitar stand attached to one of the sidewalls, the guitar stand comprising:

a lower side support attached to the sidewall, the lower side support generally rectangular in shape and comprising a first side bar pivotally attached to the sidewall, second and third side bars generally perpendicular to the first side bar, and a fourth side bar opposite the first side bar and generally perpendicular to the second and third side bars, the lower side support configured to pivot approximately 90 degrees along a pivot axis generally perpendicular to the musical instrument case height from a retracted position in which the second, third and fourth side bars confront the sidewall to an extended position in which the second and third side bars extend away from the sidewall approximately 90 degrees relative to the sidewall; and an upper side support attached to the sidewall, the upper side support located directly above the lower side support and comprising a first side bar pivotally attached to the sidewall, and second and third side bars generally perpendicular to the first side bar of the upper side support, the upper side support configured to pivot approximately 90 degrees along a pivot axis generally perpendicular to the musical instrument case height from a retracted position in which the second and third side bars of the upper side support confront the sidewall to an extended position in which the second and third side bars of the upper side support extend away from the sidewall approximately 90 degrees relative to the sidewall.

2. The musical instrument case as set forth in claim 1 wherein the musical instrument case further comprises a upper notch, the upper notch generally co-planar with the pivot axis of the upper side support and perpendicular to the case height, and a lower notch, the lower notch generally co-planar with the pivot axis of the lower side support and perpendicular to the case height, wherein the first side bar of the upper side support is moveable into the upper notch when the upper side support is in the extended position, and further wherein the first side bar of the lower side support is moveable into the lower notch when the lower side support is in the extended position.

3. The musical instrument case as set forth in claim 1 further comprising a top guitar stand, the top guitar stand comprising a first side bar pivotally attached to the lid, and second and third side bars generally perpendicular to the first side bar, the top guitar stand configured to pivot approximately 90 degrees along a pivot axis generally perpendicular to the musical instrument case height from a retracted position in which the second and third side bars of the top guitar stand are generally co-planar with the first side bar of the top guitar stand to an extended position in which the second and third side bars of the top guitar stand are located above the first side bar of the top guitar stand.

4. The musical instrument case as set forth in claim 3 further comprising a clip attached to the top guitar stand and configured to lock the top guitar stand in the retracted position.

5. The musical instrument case as set forth in claim 1, wherein the lid is pivotably attached to an exterior sidewall and is configured to pivot along a pivot axis that is generally perpendicular to the musical instrument case height from a closed position in which the lid contacts all of the exterior sidewalls to an open position in which the lid does not contact all the exterior sidewalls.

6. The musical instrument case as set forth in claim 5 further comprising at least one fastener attached to an exterior sidewall, the at least one fastener configured to hold the lid in the closed position.

7. The musical instrument case as set forth in claim 1 further comprising a tray removably attached to the floor of the musical instrument case.

8. The musical instrument case as set forth in claim 7 wherein the musical instrument case further comprises at least one fastener configured to releasably hold the tray to the floor of the musical instrument case.

9. The musical instrument case as set forth in claim 7 wherein the tray comprises a floor, an interior, a plurality of exterior walls extending from the tray floor and foam lining the interior of the tray exterior walls.

10. The musical instrument case as set forth in claim 7 wherein the tray comprises a floor and a plurality of wheels attached to the tray floor.

11. The musical instrument case as set forth in claim 1 further comprising at least one interior wall dividing the interior into a plurality of compartments.

12. The musical instrument case as set forth in claim 11 wherein the at least one interior wall is moveable.

13. The musical instrument case as set forth in claim 1 wherein the upper side support further comprises a fourth side bar, the fourth side bar opposite the first side bar of the upper side support and generally perpendicular to the second and third side bars of the upper side support and further wherein the fourth side bar of the upper side support is pivotably attached to the second side bar of the upper side support.

14. The musical instrument case as set forth in claim 13 wherein the fourth side bar of the upper side support is spring loaded.

15. The musical instrument case as set forth in claim 1 wherein the area between the first, second, third, and fourth side bars of the lower side support is hollow.

16. The musical instrument case as set forth in claim 1, wherein the upper and lower side supports are in the extended position and a lower bout of a guitar is resting on the lower side support and a neck of the guitar is located between the first, second and third side bars of the upper side support.

17. The musical instrument case as set forth in claim 1 wherein the first, second, and third side bars of the lower side support are coated with rubber.

18. The musical instrument case as set forth in claim 1 wherein the upper side support comprises a spring to bias the upper side support in the retracted position and the lower side support comprises a spring to bias the lower side support in the retracted position.

19. The musical instrument case as set forth in claim 1 wherein the upper side support and the lower side support each comprise a stop configured to limit movement of the upper and lower side supports from the retracted position to the extended position to approximately 90 degrees.

20. The musical instrument case as set forth in claim 1 wherein the second and third side bars of the upper side support are located above the first side bar of the upper side support in the retracted position, wherein the second and third side bars of the upper side support are located generally co-planar with the first side bar of the upper side support in the extended position, wherein the second and third side bars of the lower side support are located above the first side bar of the lower side support in the retracted position, and further wherein the second and third side bars of the lower side support are located generally co-planar with the first side bar of the lower side support in the extended position.

* * * * *